(12) United States Patent
Salehi et al.

(10) Patent No.: US 10,467,664 B2
(45) Date of Patent: Nov. 5, 2019

(54) METHOD FOR DETECTING SPAM REVIEWS WRITTEN ON WEBSITES

(71) Applicant: INSTITUT MINES-TELECOM, Evry (FR)

(72) Inventors: Mostafa Salehi, Tehran (IR); Saeedreza Shehnepoor, Yazd (IR); Reza Farahbakhsh, Evry (FR); Noel Crespi, Paris (FR)

(73) Assignee: INSTITUT MINES-TELECOM, Evry (FR)

( * ) Notice: Subject to any disclaimer, the term of this patent is extended or adjusted under 35 U.S.C. 154(b) by 143 days.

(21) Appl. No.: 15/419,631

(22) Filed: Jan. 30, 2017

(65) Prior Publication Data

US 2017/0221111 A1 Aug. 3, 2017

(30) Foreign Application Priority Data

Jan. 28, 2016 (EP) ..................... 16305076

(51) Int. Cl.
*G06Q 30/02* (2012.01)
*G06Q 30/00* (2012.01)
*G06Q 10/10* (2012.01)

(52) U.S. Cl.
CPC ......... *G06Q 30/0282* (2013.01); *G06Q 10/10* (2013.01); *G06Q 30/0185* (2013.01)

(58) Field of Classification Search
None
See application file for complete search history.

(56) References Cited

U.S. PATENT DOCUMENTS

| 7,992,205 B2 | 8/2011 | McRae et al. |
| 8,150,779 B1 | 4/2012 | Gauvin |
| 8,479,287 B2 | 7/2013 | Chen et al. |
| 9,043,417 B1 | 5/2015 | Jones et al. |
| 2006/0168032 A1 | 7/2006 | Cai et al. |
| 2009/0089285 A1 | 4/2009 | Donato et al. |

(Continued)

FOREIGN PATENT DOCUMENTS

EP 1675330 A1 6/2006

OTHER PUBLICATIONS

Xu ,Chang. "Combating product review spam campaigns via multiple heterogeneous pairwise features", SIAM., pp. 172-180, 2015.

(Continued)

*Primary Examiner* — Jeffrey R Swearingen
(74) *Attorney, Agent, or Firm* — Oliff PLC (57) ABSTRACT

A method for detecting if an online review written by a user on a website of a telecommunications network is a spam, using at least one previously-labeled review, a review dataset comprising at least one review to be analyzed, and a spam feature list listing different features of spam reviews, method wherein: a) a weight is computed for each spam feature of the spam feature list, corresponding to the importance of the spam feature in the detection of spam reviews, and based at least on the features of said at least one previously-labeled review, and b) a probability of being a spam for a review under analysis in the review dataset is computed by using at least the weights of the spam features computed at step a) and a comparison between the features of said review under analysis and the ones of at least one review previously-labeled as spam.

17 Claims, 3 Drawing Sheets

(56) References Cited

U.S. PATENT DOCUMENTS

| | | | |
|---|---|---|---|
| 2013/0018823 | A1 | 1/2013 | Masood |
| 2013/0332385 | A1 | 12/2013 | Kilroy et al. |
| 2014/0172989 | A1 | 6/2014 | Rubinstein et al. |
| 2014/0304814 | A1* | 10/2014 | Ott ..................... G06F 17/274 726/22 |

OTHER PUBLICATIONS

Li et al. "Learning to identify review spam", IJCAI., 2011, pp. 2488-2493.
Feng et al. "Distributional footprints of deceptive product reviews", ICWSM., 2012, pp. 98-105.
Jindal et al. "Opinion spam and analysis", WSDM., pp. 219-230, 2008.
Lim et al. "Detecting product review spammers using rating behaviors", CIKM., pp. 939-948, 2010.
Minnich et al. "Trueview: Harnessing the power of multiple review sites", proceedings of International Conference on World Wide Web., pp. 787-797, 2015.
Akoglu et al. "Opinion fraud detection in online reviews by network effects", ICWSM., 2013, pp. 2-11.
Fei et al. "Exploiting burstiness in reviews for review spammer detection", ICWSM., 2013, pp. 175-184.
Ott et al. "Estimating the prevalence of deception in online review communities", in WWW, pp. 201-210, 2012, and of M. Ott, Y. Choi, C. Cardie, and J. T. Hancock, "Finding deceptive opinion spam by any stretch of the imagination", ACL., pp. 309-319, 2011.
Ott et al. "Finding deceptive opinion spam by any stretch of the imagination", ACL., pp. 309-319, 2011.
May 25, 2016 Search Report issued in European Patent Application No. 16305076.8, 1-7 pages.
D'onfro, J. "A Whopping 20% of Yelp Reviews are Fake", 2013, <http://www.businessinsider.com/20-percent-of-yelp-reviews-fake-2013-9?IR=T>, 1 page.
Streitfeld, D."Best Book Reviews Money Can Buy", 2012, <http://www.nytimes.com/2012/08/26/business/book-reviewers-for-hire-meet-a-demand-for-online-raves.html>?, pp. 1-12.
Feng et al. "Syntactic stylometry for deception detection", ACL., 2012, pp. 171-175.
Jindal et al. "Finding unusual review patterns using unexpected rules", CIKM., 2010, pp. 1-3.
Li et al. "Spotting fake reviews via collective Positive-Unlabeled learning", ICDM., 2014, pp. 1-6.
Mukherjee et al. "Spotting opinion spammers using behavioral footprints", KDD., 2013, pp. 1-9.
Xie et al. "Review spam detection via temporal pattern discovery", KDD., 2012, pp. 1-9.
Wang et al. "Review graph based online store review spammer detection", of G. Wang, S. Xie, B. Liu, and P. S. Yu, ICDM., 2011, pp. 1-6.
Rayana et al. "Collective opinion spam detection: bridging review networks and metadata", KDD., 2015, pp. 1-10.

* cited by examiner

METHOD FOR DETECTING SPAM REVIEWS WRITTEN ON WEBSITES

The present invention relates to methods and systems for detecting if an online review written on a website of a telecom network is a spam or not.

With the emergence of the new generation of Internet, "the Web 2.0", and the fast growing of users engagement on Internet through new platforms such as social media sites, merchant and online shopping sites, users can write and read online reviews and opinions on different websites about different items, such as hotel reviews, as on Booking.com, restaurant reviews, as on Yelp.com, or product reviews, on merchant and online shopping sites, as Amazon.com. This provides a great opportunity to have an accurate and online feedback on almost any services or products. Such information can play a major role on making a decision by potential customers and consequently in the success or failure of the item targeted by the review.

Consequently, an online reviews system is at risk of attacks from spammers who, systematically and sometimes with financial support, write spam reviews, also called fake reviews. These spam reviews may correspond to false positive reviews for an item in order to promote it, or false negative reviews for an item in order to depreciate it. Some studies show that about 20% of Yelp reviews and 33% of all consumer reviews on the Internet are detected to be fake, as explained in the articles of J. D'onfro, "*A Whopping 20% Of Yelp Reviews Are Fake*", 2013, http://www.businessinsider.com/20-percent-of-yelp-reviews-fake-2013-9?IR=T, and of D. Streitfeld, "*Best Book Reviews Money Can Buy*", 2012, http://www.nytimes.com/2012/08/26/business/book-reviewers-for-hire-meet-a-demand-for-online-raves.html?. In some cases, particularly in the case of well written reviews, manual detection of spam reviews is difficult by just looking at their text.

Financial gains associated with reviews systems in online sites show the importance of monitoring reviews for detecting spam reviews. In recent years, a considerable amount of research has been done in this goal.

Some known approaches study the content of the review, by using its linguistic features, such as lexical attributes, syntax and semantic similarity, to detect spams, as described in the articles of S. Feng, R. Banerjee, and Y. Choi, "*Syntactic stylometry for deception detection*", in ACL, 2012, and of M. Ott, C. Cardie, and J. T. Hancock, "*Estimating the prevalence of deception in online review communities*", in WWW, pages 201-210, 2012, and of M. Ott, Y. Choi, C. Cardie, and J. T. Hancock, "*Finding deceptive opinion spam by any stretch of the imagination*", in ACL, pages 309-319, 2011. The article of Chang Xu and Jie Zhang, "*Combating product review spam campaigns via multiple heterogeneous pairwise features*", in SIAM 2015, pages 172-180, describes a spam detection method using pairwise features, that is to say features between two reviews, as content similarity, for finding fraudsters and frauds. The method described in the article of F. Li, M. Huang, Y. Yang, and X. Zhu, "*Learning to identify review spam*", in IJCAI, 2011, also uses content features as percentage of words in capital in reviews for finding final fraud and fraudster probability.

The approaches based on reviewer behavior use the normal pattern of reviewer behaviors to find abnormal behaviors indicating a spammer, for example burstiness, as described in the articles of S. Feng, L. Xing, A. Gogar, and Y. Choi, "*Distributional footprints of deceptive product reviews*", in ICWSM, 2012, of N. Jindal and B. Liu, "*Opinion spam and analysis*", in WSDM, pages 219-230, 2008, of N. Jindal, B. Liu, and E.-P. Lim, "*Finding unusual review patterns using unexpected rules*", in CIKM, 2010, of F. Li, M. Huang, Y. Yang, and X. Zhu, "*Learning to identify review spam*", in IJCAI, 2011, of H. Li, Z. Chen, B. Liu, X. Wei, and J. Shao, "*Spotting fake reviews via collective PU learning*", in ICDM, 2014, of E.-P. Lim, V.-A. Nguyen, N. Jindal, B. Liu, and H. W. Lauw, "*Detecting product review spammers using rating behaviors*", in CIKM, pages 939-948, 2010, of A. Mukherjee, A. Kumar, B. Liu, J. Wang, M. Hsu, M. Castellanos, and R. Ghosh, "*Spotting opinion spammers using behavioral footprints*", in KDD, 2013, and of S. Xie, G. Wang, S. Lin, and P. S. Yu, "*Review spam detection via temporal pattern discovery*", in KDD, 2012.

In particular, this kind of approaches uses review's metadata for finding spam and spammers. For example, the method described in the article of A. j. Minnich, N. Chavoshi, A. Mueen S. Luan and Faloutsos, M., "*Trueview: Harnessing the power of multiple review sites*", proceedings of International Conference on World Wide Web, pp. 787-797, 2015, uses temporal and location features of users. This work assume for example that spammers leave their comments at the beginning of the week after their holidays spent in a hotel to be reviewed, or that normal users can't leave comments on hotels which are close to each other, because they can't rent a room in every hotel in one region, maybe one or two, but not most of them. So these so-called behavioral approaches extract behavior-based features from datasets used to acquire final cluster results, as explained in the article of Jindal et al., 2008, whose method extracts 36 behavior-based features and uses a supervised approach to identify spammers.

Another kind of approaches, called "Review Network", deals with relationships among different types of involved entities such as reviews, reviewers, the items being reviewed, for identifying spam reviews, as described in the articles of L. Akoglu, R. Chandy, and C. Faloutsos, "*Opinion fraud detection in online reviews by network effects*", in ICWSM, 2013, of G. Fei, A. Mukherjee, B. Liu, M. Hsu, M. Castellanos, and R. Ghosh, "*Exploiting burstiness in reviews for review spammer detection*", in ICWSM, 2013, of Li et al., 2014, of G. Wang, S. Xie, B. Liu, and P. S. Yu, "*Review graph based online store review spammer detection*", in ICDM, 2011, or Rayana, S. and Akoglu, L. "*Collective opinion spam detection: bridging review networks and metadata*", KDD, 2015. In particular, this kind of approaches uses network-based algorithms and classifiers to cluster each component. These classifiers can be message distribution based-algorithms, such as "Loopy Belief Propagation" (LBP), or heterogeneous network classifiers. Message distribution based-algorithms are largely used for solving spam and fraud detection problems. For example, the method described in Akoglu et al., 2013, uses LBP and empirical compatibility matrix in 13 iterations for finding fraudsters.

U.S. Pat. No. 9,043,417 relates to the Group Spam Rank (GSRank) system of Google, consisting in detecting spam posts or comments, on blogs or sites, by using elements of the whole content of the blog or website, as for example the profile of the user.

Application US 2013/0332385 discloses a system capable of aggregating user generated online review information and integrating it with user generated opinion or assessment information related to a product.

Applications US 2014/0172989 and U.S. Pat. No. 8,150,779 describes a social networking system for detecting spam in comments or in contents posted by users on a social network.

U.S. Pat. No. 7,992,205 relates to a method for deterring spam over Internet Protocol telephony and spam Instant Messaging.

Application US 2013/0018823 discloses a method of detecting undesirable content or posts on a social network website, by using manual feature content checking.

Application US 2006/0168032 describes a method for detecting spam messages based on the content of the message, using text mining. U.S. Pat. No. 8,479,287 describes a method for detecting spam messages based on the content of the message, analyzing the time attributes of the messages.

There is a need to further improve the methods for detecting spam reviews on websites, in order to improve the quality of spam detection and to guarantee feedbacks as accurate as possible for customers.

One object of the invention, according to a first of its aspects, is a method for detecting if an online review written by a user on a website of a telecommunications network is a spam, using at least one previously-labeled review, a review dataset comprising at least one review to be analyzed, and a spam feature list listing different features of spam reviews, method wherein:

a) a weight is computed for each spam feature of the spam feature list, corresponding to the importance of the spam feature in the detection of spam reviews, and based at least on the features of said at least one previously-labeled review, and b) a probability of being a spam for a review under analysis in the review dataset is computed by using at least the weights of the spam features computed at step a) and a comparison between the features of said review under analysis and the ones of at least one review previously-labeled as spam.

The invention not only uses spam features but also considers the importance of each spam feature in the spam detection procedure. This allows obtaining a better accuracy in the detection of spam reviews.

The invention allows helping websites to identify and filter the spam reviews in their website and provide a more accurate feedback to their customers.

The weights computed for each spam feature are function of the level of importance of each spam feature, in order to classify an unlabeled review as spam or non-spam. It allows ranking the predefined features.

In the present invention, consistency with the previously-labeled reviews is also taken into account, by taking into account a comparison between the features of the review under analysis and the ones of different previously-labeled spam reviews, during the computation of the spam probability.

Heterogeneous Information Network

The method according to the invention may be reformulated to a classification problem in heterogeneous information networks over users, reviews, items and spam features. The relations in a heterogeneous information network include not only direct links between nodes but also paths between several nodes, along several links, called meta paths.

Heterogeneous information networks are described in the book of Sun, Y., and Han, J. "*Mining heterogeneous information networks: Principles and methodologies*", Synthesis Lectures on Data Mining and Knowledge Discovery 3(2), 1-159, 2012.

A heterogeneous information network is defined as a graph G=(V,E) where each node v∈V and each link e∈E belong to one particular node type and one particular link type respectively, and if two links belong to the same type, the types of the starting and ending nodes of those links are the same. There may be r types of nodes with r>1 and s types of relation links between the nodes, with s>1.

Given a heterogeneous information network G=(V, E), a network schema T=(A, R) is a meta template with the node type mapping $\tau: V \rightarrow A$ and the link mapping $\varphi: E \rightarrow R$, which is a graph defined over node types A, with links as relations from R. The network schema describes the meta structure of a given network, that is to say how many node types there are and where the possible links exist.

Given a heterogeneous information network G=(V, E), a meta path P is defined by a sequence of relations in the network schema T=(A, R), and is denoted in the form of $A_1 (R_1)A_2(R_2) \ldots (R_{l-1})A_l$, which defines a composite relation $P=R_1 \circ R_2 \circ \ldots \circ R_{l-1}$ between two nodes, and o is the composition operator on relations. For convenience, it can be represented by a sequence of node types when there is no ambiguity, for example $P=A_1 A_2 \ldots A_l$. The meta path extends the concept of link types to path types and describes different relations among node types through indirect links, or paths, and implies diverse semantics.

Given a heterogeneous information network G=(V, E), V' is a subset of V which contains nodes with the type of nodes to be classified, called "target types". The subset V' containing some previously-labeled nodes, the clustering task is to predict the labels for all the unlabeled nodes in the subset V'.

Review Dataset

The review dataset may include all the reviews written on the website and some related information about each review, in particular its text, the name of the user who had written it, the Internet Protocol (IP) address of the user, the item targeted by the review, and/or the timestamp of generating of the review.

The review dataset may be provided by the owner of the website, or a tool may be used for collect the reviews and generate the review dataset.

Previously-labeled Reviews

Previously-labeled reviews may be reviews already-labeled as spam or non-spam, manually by experts or by any automatic machine based method, for example through natural language processing (NLP) methods.

Previously-labeled reviews may come from previous iterations of the method according to the invention.

Spam Features

The spam feature list corresponds to a list of predefined indicative features of a review being a spam. Some of these features are known in the domain of spam detection, for example from the above-mentioned article of Rayana et al., 2015.

Spam features may be user-based, review-based or item-based.

Spam features may be divided in two groups: suspicious behavior-based features, including features of burstiness, polarity deviation and high ratio, and similarity-based features, including IP address, content and owner similarity features.

Burstiness, a user-based spam feature, preferably refers to suspicious users who often write a lot of reviews in a very short time. The above-mentioned article of Fei et al., 2013 defines the following metric: $BST(u)=1-(L(u)-F(u)/28)$, with $L(u)-F(u)$ the number of days between last and first review of a user u. If $BST(u)>0.8$, user u is considered to have a burstiness behavior.

Polarity deviation, or rating deviation, a review-based feature, preferably refers to a review of an item which deviates from item's average rating, as described in the above-mentioned article of Li et al., 2011. Polarity of a review in text format can be extracted by NLP methods.

High ratio, an item-based feature, preferably refers to a suspicious behavior due to a high ratio, for example equal or greater than 80%, of positive reviews, for example a rating of 4 or 5, or of negative reviews, for example a rating of 1 or 2, as explained in the above-mentioned article of Mukherjee et al., 2013.

The user-based IP address similarity feature allows advantageously determining if two users that have written at least two reviews for the same item are in fact the same one, as explained in the above-mentioned article of Li et al., 2014.

The review-based content similarity feature studies the pairwise cosine similarity among the texts of two reviews of the same item. If said pairwise cosine similarity is higher than a predefined threshold, then the reviews are similar, as described in the above-mentioned articles of Fei et al., 2013, Lim et al., 2010, Mukherjee et al., KDD 2013, and Mukherjee et al., ICWSM 2013.

The item-based owner similarity feature allows determining if the owners of two items are similar or not. The idea behind using this feature is that a specific owner may be targeted by spammers.

At the end of the method according to the invention, the importance of each spam feature may be displayed, showing the role of each considered spam feature in the detecting method.

Analyzing and Labeling Reviews

The heterogeneous information network formulating the method according to the invention, called hereinafter "review network", may contain four types of nodes, User, Review, Item, and Spam Feature, which itself includes different subtypes as described above. The review network may take the review dataset and the spam feature list as inputs.

For example, links existing between reviews and content similarity nodes are defined by the relation "a review contains a text which is similar, in terms of syntax or semantic, to another review". Therefore, for extracting such information from the review dataset to generate review network, clear definition of each spam feature is necessary.

A network schema and some meta paths, as defined above, may be generated based on the given spam feature list.

Weights

The at least one previously-labeled review used for computing the weights of the spam features may be a spam review or not.

The weights of the meta paths defined by the spam features are computed assuming that classifying the nodes in the review network is based on their relations to other nodes in the network, linked nodes having a high possibility to have the same label, and that some previously-labeled reviews are available before the learning process. Using such meta paths leads to rich semantic meanings.

The weights of the spam features allow answering important questions, as in particular which spam feature, or meta path, is better to be considered to detect a spam review, for example the meta path connecting reviews via polarity deviation, the one connecting reviews via content similarity in reviews, or the one determined by IP address similarity. Moreover, the weights of spam features help to understand the formation mechanism of a spam review.

In addition, since some of these spam features may need considerable computational cost, for example computing content similarity of reviews through NLP methods in a large review dataset, choosing more important features in the spam detection method leads to less time complexity to reach more accurate results. Therefore, when more spam features are used, more accurate results are obtained, because the importance of spam features is involved based on what is learned from the review dataset.

The weights of a meta path $p_i$, for i=1, ..., m, where m is the number of meta paths which depends on the spam feature list, may be expressed as:

$$W_{pi} = \frac{\sum_{r=1}^{n}\sum_{s=1}^{n} x_{rs}^{pi} \times y_r^{spam} \times y_s^{spam}}{\sum_{r=1}^{n}\sum_{s=1}^{n} x_{rs}^{pi}}$$

where n denotes the number of previously-labeled reviews, $x_{rs}^{pi}=1$ if there is a path between review r and review s through meta path $p_i$, otherwise $x_{rs}^{pi}=0$, and $y_r^{spam}=1$ if review r is labeled as spam in the previously-labeled reviews, otherwise $y_r^{spam}=0$.

For meta path $p_i$, the numerator of the previous equation preferably corresponds to the number of paths between two spam reviews based on said meta path $p_i$, its denominator computing the total number of paths between all pairs of reviews based on this meta path $p_i$. This weights computation shows the proportion of paths between all pairs of reviews based on meta path $p_i$ which connect two spam reviews.

Probabilities

The probability $Pr_{uv}^{spam}$ of a review u under analysis in the review dataset being spam by considering its relationship with previously-labeled spam review v through different meta paths $p_i$, for i=1, ..., m, where m is the number of meta paths, may be expressed as:

$$Pr_{uv}^{spam} = 1 - \left(\prod_{i=1}^{m} x_{uv}^{pi} \times (1 - W_{pi})\right)$$

where $x_{uv}^{pi}=1$ if there is a path between review u and spam review v through meta path $p_i$, and $W_{pi}$ the weights computed as previously defined.

$Pr_{uv}^{spam}$ is the probability of the union of m mutually independent events, for example a review u being spam by considering its relationship with spam review v through m mutually independent meta paths. Its computation considers the intersection of their complements $(1-W_{pi})$.

The probability $Pr_u^{spam}$ of review u being spam by considering its relationship with all previously-labeled spam reviews, may be expressed as:

$$Pr_u^{spam} = \max\{Pr_{u1}^{spam}, Pr_{u2}^{spam}, \ldots, Pr_{ul}^{spam}\}$$

where l denotes the number of reviews with spam label in the previously-labeled reviews.

This computation takes into account the comparison between the features of the unlabeled review u and the ones of the previously-labeled spam reviews.

The method of the invention advantageously returns the probability $Pr_u^{spam}$ for the review u to be a spam, for example with a score in %.

This probability may be used to label the review "spam" or "non-spam", in the review dataset. A review may be labeled "spam" if the probability $Pr_u^{spam}$ is greater to a predefined value, for example equal to 50%

Computer Program Product

Another object of the invention is a computer program product for detecting if an online review written by a user on a website of a telecommunications network is a spam, using at least one previously-labeled review, a review dataset comprising at least one review to be analyzed, and a spam feature list listing different features of spam reviews, the computer program product comprising instructions that can be read by a computer infrastructure of the telecommunications network, the computer infrastructure comprising at least one processor, these instructions controlling the operation of said computer infrastructure so that:

a) a weight is computed for each spam feature of the spam feature list, corresponding to the importance of the spam feature in the detection of spam reviews, and based at least on the features of said at least one previously-labeled review, and b) a probability of being a spam for a review under analysis in the review dataset is computed by using at least the weights of the spam features computed at step a) and a comparison between the features of said review under analysis and the ones of at least one review previously-labeled as spam.

The at least one previously-labeled review and the review dataset are preferably stored in a database, the computer infrastructure having access to said database.

All of the features defined above for the method apply to the computer program product, and vice-versa.

System

Another object of the invention is a system for detecting if an online review written by a user on a website of a telecommunications network is a spam, using at least one previously-labeled review, a review dataset comprising at least one review to be analyzed, and a spam feature list listing different features of spam reviews, the system comprising:

a weights module configured to compute a weight for each spam feature of the spam feature list, corresponding to the importance of the spam feature in the detection of spam reviews, and based at least on the features of said at least one previously-labeled review, and a labels module configured to compute a probability of being a spam for a review under analysis in the review dataset by using at least the weights of the spam features computed by the weights module and a comparison between the features of said review under analysis and the ones of at least one review previously-labeled as spam.

The system according to the invention may further comprise a review network generator, configured to generate a review network from a given review dataset and a given spam feature list.

The system may further comprise a network schema generator and a meta paths generator, configured to generate a network schema and meta paths based on said spam feature list.

The weights module and the labels module may be sub-modules of a model module.

The spam detection system according to the invention may be embedded on a remote server, or on a personal computer, which preferably has access to the database storing the previously-labeled reviews and the review dataset.

All of the features defined above for the method and the computer program product apply to the system, and vice-versa.

DETAILED DESCRIPTION

The invention will be better understood on reading the following detailed description of non-limiting exemplary embodiment thereof and on examining the appended drawings in which.

Figure 1:
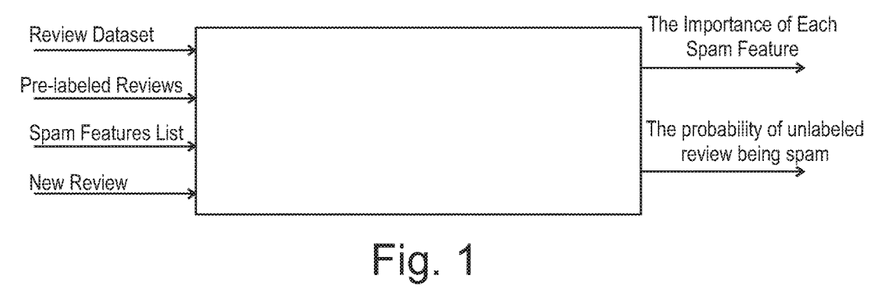
FIG. 1 is a block diagram illustrating the inputs and outputs of the method according to the invention.

As shown in FIG. 1, the method for detecting if an online review written by a user on a website of a telecommunications network is a spam, according to the invention, uses some previously-labeled reviews, a review dataset comprising reviews to be analyzed, and a spam feature list listing different features of spam reviews. A new review, comprised in the review dataset, has to be analyzed. The method according to the invention computes weights for each spam feature of the spam feature list, corresponding to the importance of the spam feature and based at least on the features of the previously-labeled reviews, and a probability of being a spam for the review under analysis, by using at least said computed weights of the spam features and a comparison between the features of the review under analysis and the ones of different previously-labeled spam reviews.

Figure 2:
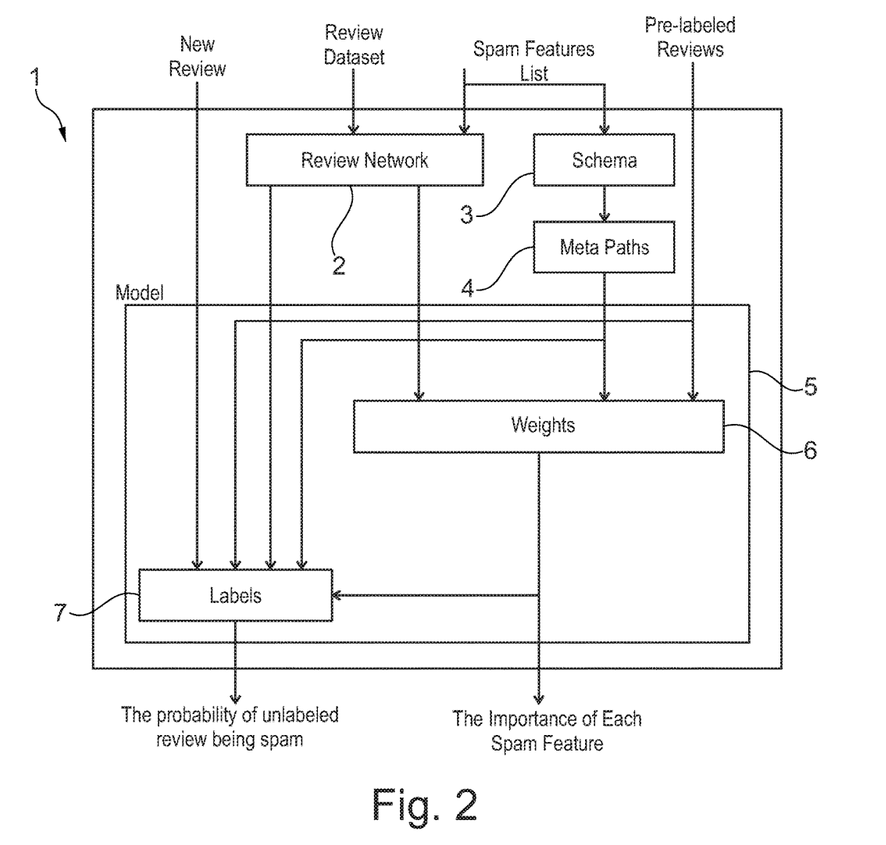
FIG. 2 represents a diagram illustrating different elements and steps of the method according to the invention.

As shown in FIG. 2, the method according to the invention may be implemented in a review detection system 1, comprising a review network generator 2, configured to generate a review network, as defined above, from a given review dataset and a given spam feature list.

The system 1 preferably comprises also a network schema generator 3 and a meta paths generator 4, configured to generate a network schema and meta paths based on the given spam feature list, as defined above.

Preferably and as illustrated in FIG. 2, the system 1 further comprises a model module 5 configured to computes the weights of the spam features, depending on previously-labeled reviews, in a weights module 6, and the probabilities of being a spam for reviews under analysis, as previously defined, in a labels module 7.

The Table below shows examples for different m=8 meta paths based on different spam features, as defined above, and their semantics, with U=User, R=Review, I=Item.

| Row | Notation | Meta Path | Semantic |
|---|---|---|---|
| 1 | RUR | Review - User - Review | Reviews written by same User |
| 2 | RIR | Review - Item - Review | Reviews written for same Item |
| 3 | RUBrUR | Review -User - Burstiness (Br) - User - Review | Reviews written by users with burstiness behavior |
| 4 | RPdR | Review - Polarity Deviation (Pd) - Review | Reviews with high polarity deviations |
| 5 | RIHrIR | Review - Item - High ratio (Hr) - Item - Review | Reviews on items with high ratio of positive/negative reviews |
| 6 | RUIsUR | Review - User-IP similarity (UIs) - User-Review | Reviews generated by users with similar IP addresses |

| Row | Notation | Meta Path | Semantic |
|---|---|---|---|
| 7 | RCsR | Review - Content Similarity (Cs) - Review | Reviews with similar content |
| 8 | RIOsIR | Review - Item - Owner Similarity (Os) - Item - Review | Reviews written for items with similar Owner |

As shown, the length of user-based and item-based spam features is four and the length of other meta paths is two.

Figure 3:
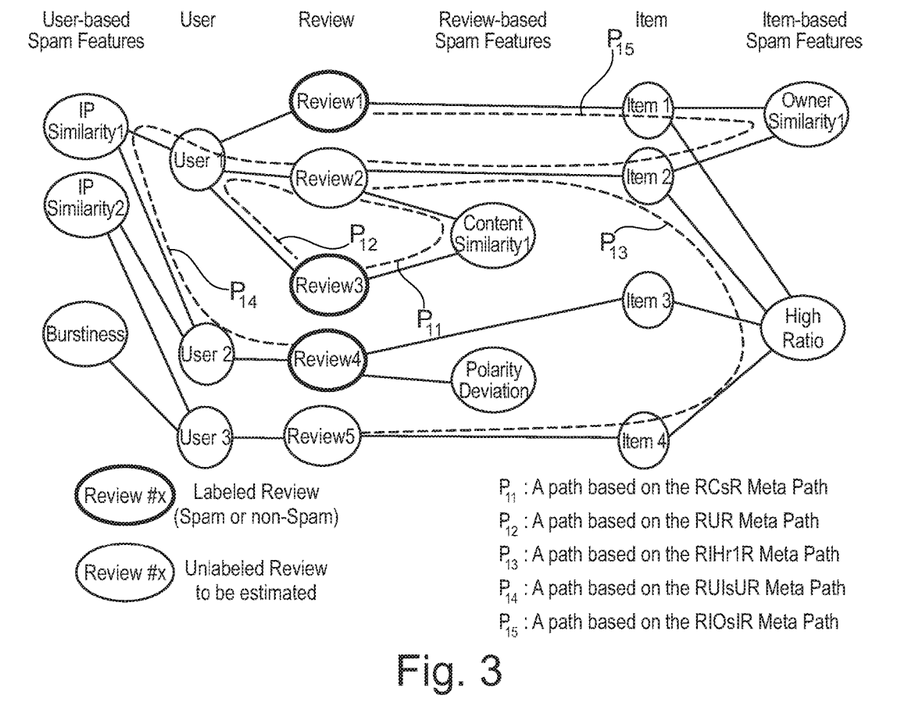
FIG. 3 shows an example of the generation of a review network according to the invention.

FIG. 3 shows an example for a generated Review Network according to the invention, based on given review dataset and spam feature list, and some examples for different paths $P_{11}$, $P_{12}$, $P_{13}$, $P_{14}$, $P_{15}$, based on different meta paths defined by different spam features. Path $P_{11}$ is based on the Review—Content similarity—Review meta path. Path $P_{12}$ is based on the Review—User—Review meta path. Path $P_{13}$ is based on the Review—Item—High ratio—Item—Review meta path. Path $P_{14}$ is based on the Review—User—IP similarity—User—Review meta path. Path $P_{15}$ is based on the Review—Item—Owner similarity—Item—Review meta path.

As visible in FIG. 3, the nodes with spam features types are extracted from the review dataset according to the definitions of each feature. The unlabeled reviews to be analyzed in the generated review network are shown in white.

Figure 4:
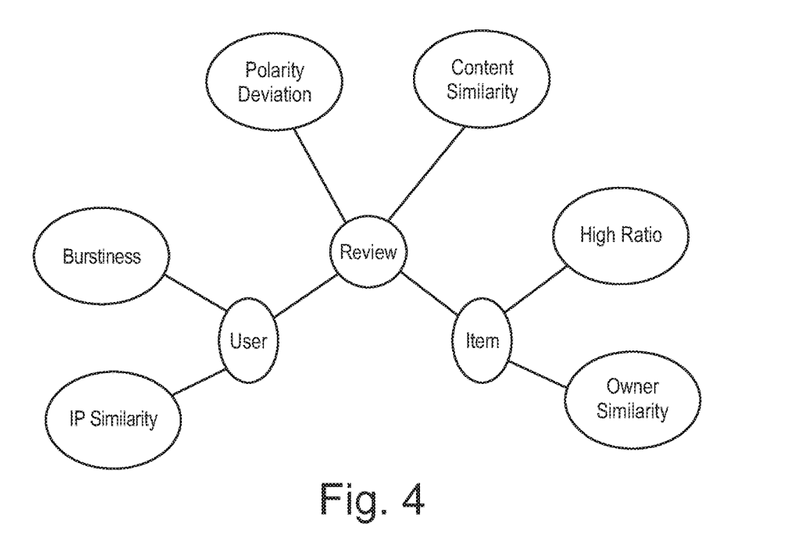
FIG. 4 shows an example of a schema of spam features according to the invention.

An example for a network schema based on a given spam feature list is shown in FIG. 4, taking into account the different spam features and their links with the review, the user and the item.

Figure 5:
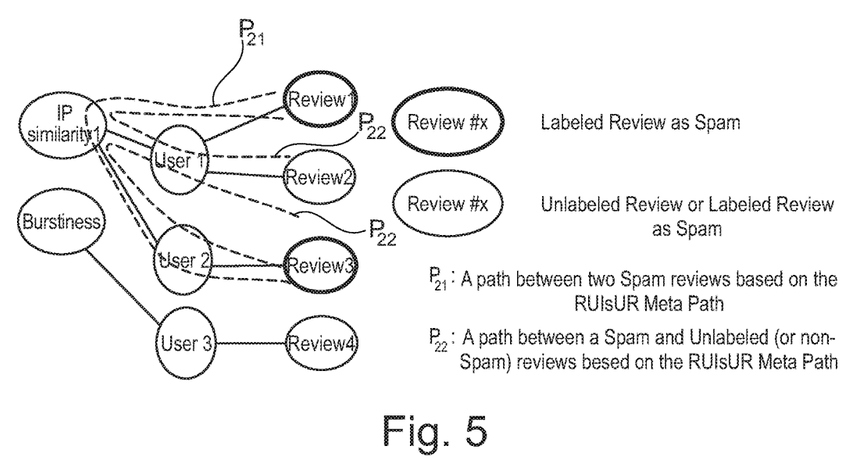
FIG. 5 shows an example of the computation of the weight of a spam feature according to the invention.

FIG. 5 shows an example of the computation of the weight of the spam feature "IP similarity" according to the invention, defining a Review—User—IP similarity—User—Review meta path $P_{21}$. The weight of meta path $P_{21}$ in this example is $$W_{P21} = \frac{[(0+1+0)+(0+0+0)+(1+0+0)+(0+0+0)]}{[(1+1+0)+(1+1+0)+(1+1+0)+(0+0+0)]} = \frac{2}{6} = 0.33.$$

Figure 6:
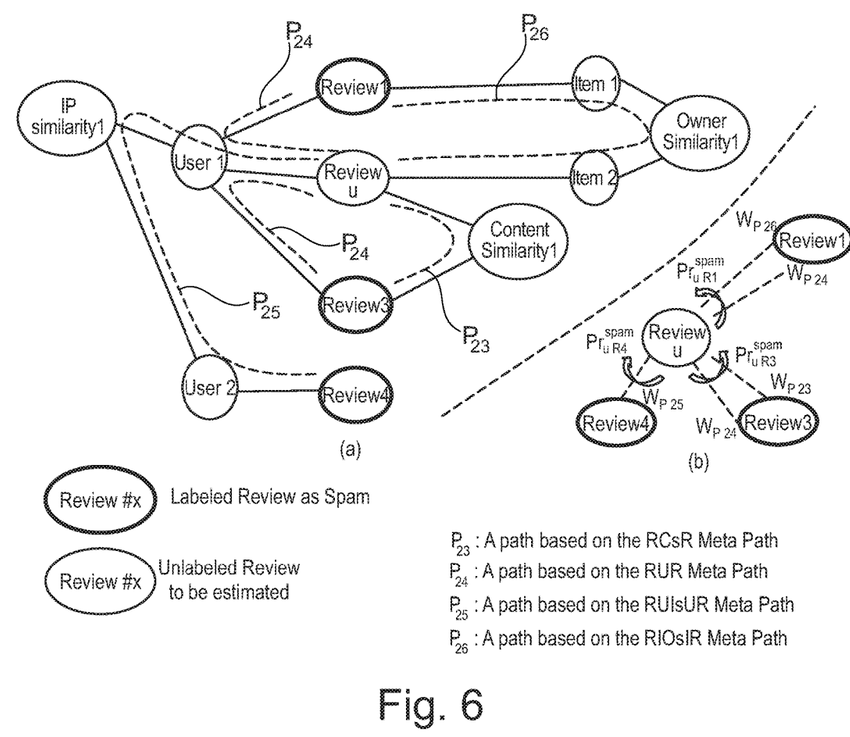
FIG. 6 shows an example of the computation of a probability of a review being spam according to the invention.

FIG. 6 shows an example of the computation of the probability of Review u being spam, by considering its relationship with three spam reviews Review1, Review3, and Review4, through four meta paths $P_{23}$, $P_{24}$, $P_{25}$, and $P_{26}$. First, the probability of Review u being spam is computed by considering its relationship with each spam review, which corresponds to a comparison between the features of each review, as previously defined. For example, the probability of unlabeled Review u being spam by considering its relationship with spam Review1 through meta paths $P_{24}$ and $P_{26}$ is $Pr_{uR1}^{spam} = 1 - [(1-W_{P24})(1-W_{P26})]$. Then, the probability of unlabeled Review u being spam is $Pr_u^{spam} = \max\{Pr_{uR1}^{spam}, Pr_{uR3}^{spam}, Pr_{uR4}^{spam}\}$.

In the method according to the invention, there are at least three steps that have impact on time complexity.

The first one is extracting the spam features from a given review dataset for generating the nodes of the review network. The highest time complexity of this step comes from content similarity between reviews which can be computed as $O(n^2t)$ where n is the number of reviews in the network and t is the number of words in a review. Computing content similarity is done by using the inner product of two reviews, which corresponds to the dot product of each element in a vector with each element in another vector. If inner product value is high, there is low similarity between two reviews and vice-versa. Such an inner product has a complexity of $O(t)$.

The second step corresponds to the computation of the weights of meta paths between reviews. Since computing these weights needs examining if there is a meta path between two reviews, for each review, it has a time complexity around $O(n^2)$, where n is the number of reviews, for one meta path. Considering all m meta paths, the time complexity for the weights computation is $O(n^2m)$.

In the final step, different meta paths and their weights are used for computing final probabilities. In particular, for each review to be analyzed, a connection with each spam review based on different meta paths is searched, as previously defined, and the probability of being spam is computed. The time complexity for computing $Pr_{uv}^{spam}$ is $O(m)$. To compare an unlabeled review with all spam reviews and calculate the final probability $Pr_u^{spam}$ of being spam, the time complexity is $O(n)$. Therefore, considering all n unlabeled reviews, the whole time complexity of this step is $O(n^2m)$.

In conclusion, the time complexity of the method of the invention is around $O(n^2t)+O(n^2m)+O(n^2m)$, which is equal to $O(n^2t)+O(n^2m)$.

The time complexity of the method described in the above-mentioned article of Rayana et al., 2015 is of $O(n^2t)+O(\epsilon d^2h)$, where n is the number of reviews, t is the number of words in each review, $\epsilon$ is the number of edges in the review network, d is the maximum number of class for each object type in the network and h is the number of iteration for the convergence of algorithm. $O(n^2t)$ corresponds to the time complexity of computing content similarity. This time complexity is thus higher than the one of the method according to the invention.

The invention is not limited to the example that has just been described.

The invention may be used to provide a better and more accurate feedback on online shopping and online marketing, which counts to a considerable portion of the whole market. A key part on the success of online shopping sites is the reviews that have been provided by their customers which can attract new customers and persuade them to do a purchase on their portal.

The invention may also be used in social networks portals, as for example Facebook, Google+, or Twitter, to filter the fake posts or the fake comments on the published posts. More generally, the invention may be useful to companies that offer products or services in order to evaluate the gotten feedback from their customers by identifying fake comments, and to end users and customers for having an accurate feedback from other user on a targeted product or service.

The expression "comprising a" or "including a" must be understood as being synonymous with "comprising at least one" or "including at least one", unless specified otherwise.

The invention claimed is:

1. A method for detecting whether an online review written by a user on a website of a telecommunications network is spam, using computer infrastructure, the method comprising:
   providing at least one previously-labeled review, a review dataset comprising at least one review to be analyzed, and a spam feature list listing different features of spam reviews,
   computing a weight for each spam feature of the spam feature list, corresponding to the importance of the spam feature in the detection of spam reviews, and based at least on the features of the at least one previously-labeled review, and computing a probability of being a spam for a review under analysis in the review dataset based on the computed weights of the spam features and a comparison between the features of the review under analysis and the ones of at least one review previously-labeled as spam, wherein:

the spam features are: (i) user-based, including features of burstiness and IP address, (ii) review-based, including features of polarity deviation and content, or (iii) item-based, including features of high ratio and owner similarity, the at least one previously-labeled review and review dataset are stored in a database to which the computer infrastructure has access the weights of a meta path $p_i$, for i=1, . . . , m where m is the number of meta paths which depends on the spam feature list, are expressed as:

$$W_{pi} = \frac{\sum_{r=1}^{n} \sum_{s=1}^{n} x_{rs}^{pi} \times y_{r}^{spam} \times y_{s}^{spam}}{\sum_{r=1}^{n} \sum_{s=1}^{n} x_{rs}^{pi}}$$

where n denotes the number of previously-labeled reviews; $x_{rs}^{pi}=1$ if there is a path between review r and review s through meta path $p_i$, otherwise $x_{rs}^{pi}=0$; and $y_{r}^{spam}=1$ if review r is labeled as spam in the previously-labeled reviews, otherwise $y_{r}^{spam}=0$.

2. The method according to claim 1, wherein the review dataset includes all the reviews written on the website and some related information about each review.

3. The method according to claim 2, wherein the related information about each review includes a text of the review itself, the name of the user that had written the review, the IP address of the user, the item targeted by the review, and/or the timestamp of generating of the review.

4. The method according to claim 1, wherein the previously-labeled-reviews are reviews already-labeled as spam or non-spam, manually by experts or by any automatic machine based method.

5. The method according to claim 1, wherein the spam features are divided in two groups: suspicious behavior-based features, including features of burstiness, polarity deviation and high ratio, and similarity-based features, including IP address, content and owner similarity features.

6. The method according to claim 1, wherein the probability $Pr_{uv}^{spam}$ of the review u under analysis in the review dataset being spam by considering its relationship with previously-labeled spam review v through different meta paths $p_i$, for i=1, . . . , m where m is the number of meta paths, is expressed as:

$$Pr_{uv}^{spam} = 1 - \left( \prod_{i=1}^{m} x_{uv}^{pi} \times (1 - W_{pi}) \right)$$

where $x_{uv}^{pi}=1$ if there is a path between review u and spam review v through meta path $p_i$.

7. The method according to claim 6, wherein the probability $Pr_u^{spam}$ of the review u being spam by considering its relationship with all previously-labeled spam reviews, is expressed as:

$$Pr_u^{spam} = \max\{Pr_{u1}^{spam}, Pr_{u2}^{spam}, \ldots, Pr_{ul}^{spam}\}$$

where l denotes the number of reviews with spam label in the previously-labeled reviews.

8. The method according to claim 1, wherein, after the computation of the spam probability, the review under analysis is labeled as spam or non-spam.

9. The method according to claim 8, wherein a review is labeled "spam" if the probability $Pr_u^{spam}$ is greater to a predefined value.

10. The method according to claim 9, wherein the predefined value being equal to 50%.

11. The method according to claim 1, wherein the previously-labeled-reviews are reviews already-labeled as spam or non-spam through natural language processing (NLP) methods.

12. A non-transitory computer readable medium storing a computer program product for detecting if an online review written by a user on a website of a telecommunications network is a spam, the computer program product causing a processor to execute steps comprising:

obtain at least one previously-labeled review, a review dataset comprising at least one review to be analyzed, and a spam feature list listing different features of spam reviews, computing a weight is computed for each spam feature of the spam feature list, corresponding to the importance of the spam feature in the detection of spam reviews, and based at least on the features of the at least one previously-labeled review, and computing a probability of being a spam for a review under analysis in the review dataset based on at least the computed weights of the spam features and a comparison between the features of the review under analysis and the ones of at least one review previously-labeled as spam, wherein:

the spam features are: (i) user-based, including features of burstiness and IP address, (ii) review-based, including features of polarity deviation and content, or (iii) item-based, including features of high ratio and owner similarity, the at least one previously-labeled review and review dataset are stored in a database to which the computer infrastructure has access the weights of a meta path $p_i$, for i=1, . . . , m where m is the number of meta paths which depends on the spam feature list, are expressed as:

$$W_{pi} = \frac{\sum_{r=1}^{n} \sum_{s=1}^{n} x_{rs}^{pi} \times y_{r}^{spam} \times y_{s}^{spam}}{\sum_{r=1}^{n} \sum_{s=1}^{n} x_{rs}^{pi}}$$

where n denotes the number of previously-labeled reviews; $x_{rs}^{pi}=1$ if there is a path between review r and review s through meta path $p_i$, otherwise $x_{rs}^{pi}=0$; and $y_{r}^{spam}=1$ if review r is labeled as spam in the previously-labeled reviews, otherwise $y_{r}^{spam}=0$.

13. The non-transitory computer readable medium according to claim 12, wherein the at least one previously-labeled review and the review dataset are stored in a database, the computer infrastructure having access to the database.

14. A system for detecting whether an online review written by a user on a website of a telecommunications network is spam, the system comprising:
a processor programmed to:
obtain at least one previously-labeled review, a review dataset comprising at least one review to be analyzed, and a spam feature list listing different features of spam reviews,
compute, as a weights module, a weight for each spam feature of the spam feature list, corresponding to the importance of the spam feature in the detection of spam reviews, and based at least on the features of the at least one previously-labeled review, and
compute, as a labels module, a probability of being a spam for a review under analysis in the review dataset based on at least the computed weights of the spam features and a comparison between the features of the review under analysis and the ones of at least one review previously-labeled as spam, wherein:
the spam features are: (i) user-based, including features of burstiness and IP address, (ii) review-based, including features of polarity deviation and content, or (iii) item-based, including features of high ratio and owner similarity,
the at least one previously-labeled review and review dataset are stored in a database to which the computer infrastructure has access the weights of a meta path $p_i$, for i=1, ..., m where m is the number of meta paths which depends on the spam feature list, are expressed as:

$$W_{pi} = \frac{\sum_{r=1}^{n} \sum_{s=1}^{n} x_{rs}^{pi} \times y_r^{spam} \times y_s^{spam}}{\sum_{r=1}^{n} \sum_{s=1}^{n} x_{rs}^{pi}}$$

where n denotes the number of previously-labeled reviews; $x_{rs}^{pi}=1$ if there is a path between review r and review s through meta path $p_i$, otherwise $x_{rs}^{pi}=0$; and $y_r^{spam}=1$ if review r is labeled as spam in the previously-labeled reviews, otherwise $y_r^{spam}=0$.

15. The system according to claim 14, wherein the processor is configured to generate a review network from a given review dataset and a given spam feature list.

16. The system according to claim 14, wherein the processor is configured to generate a network schema and meta paths based on the spam feature list.

17. The system according to claim 14, wherein the weights module and the labels module are sub-modules of a model module.

* * * * *